United States Patent [19]
Killian

[11] Patent Number: 5,393,950
[45] Date of Patent: Feb. 28, 1995

[54] ELECTRODE DISPLACEMENT MONITORING AND CONTROL

[75] Inventor: Michael L. Killian, Troy, Mich.

[73] Assignee: Eaton Corporation, Cleveland, Ohio

[21] Appl. No.: 224,899

[22] Filed: Apr. 8, 1994

[51] Int. Cl.⁶ .............................................. B23K 11/24
[52] U.S. Cl. ................................................ 219/110
[58] Field of Search ................................ 219/110, 109

[56] References Cited
U.S. PATENT DOCUMENTS

| | | | |
|---|---|---|---|
| 4,296,304 | 10/1981 | Defourny | 219/86.41 |
| 4,419,558 | 12/1983 | Stiebel | 219/109 |
| 4,441,006 | 4/1984 | Machida et al. | 219/110 |
| 4,447,700 | 5/1984 | Cohen | 219/117.1 |
| 4,449,029 | 5/1984 | Nied | 219/117.1 |
| 4,461,944 | 7/1984 | Cohen | 219/110 |
| 4,596,917 | 6/1986 | Nied et al. | 219/109 |
| 4,684,778 | 8/1987 | Cecil | 219/89 |
| 4,714,913 | 12/1987 | Cohen | 340/347 |
| 4,734,555 | 3/1988 | Ferguson | 219/109 |
| 4,803,331 | 2/1989 | Cohen | 219/110 |
| 4,861,959 | 8/1989 | Cecil | 219/89 |
| 5,220,145 | 6/1993 | Cecil et al. | 219/110 |

FOREIGN PATENT DOCUMENTS 9401236 1/1994 WIPO .

Primary Examiner—Clifford C. Shaw
Attorney, Agent, or Firm—Jennifer M. Stec

[57] ABSTRACT

An electrode displacement monitoring and control system for predicting and adaptively controlling resistance weld quality. The distance (34) between the movable electrode (16) and a fixed point such as on a workpiece (12) surface is monitored during a resistance weld cycle. The displacement information is processed and applied as a control signal for dynamically and adaptively varying various weld parameters including current application in order to control weld quality. A reversal in the direction of electrode displacement is identified and used in the adaptive control strategy.

16 Claims, 5 Drawing Sheets

ELECTRODE DISPLACEMENT MONITORING AND CONTROL

BACKGROUND OF THE INVENTION

This invention relates generally to resistance welding systems and, more particularly, to a system and method of predicting and adaptively controlling resistance weld quality by monitoring the displacement of a movable electrode with respect to the workpiece or other stationary point.

In a typical resistance welding application, and in particular a resistance spot welding application, metallic workpieces are positioned in an overlapping relationship between a pair of axially opposing electrodes. One electrode is substantially fixed in position and the other electrode is movable toward the fixed electrode. To effect welding, the movable electrode is moved toward the fixed electrode, squeezing or compressing the workpieces therebetween. An electrical current is then passed between the electrodes, and the resistance of the workpiece material is used to melt a localized area in each of the workpieces. When the current is interrupted the molten metal solidifies, thereby fusing the workpieces together. Similarly, in a resistance projection welding application, a single movable electrode moves axially toward a platform or base on which the workpieces are supported. Like spot welding, the workpieces are compressed by the movable electrode and an applied current melts a localized area of each of the workpieces which subsequently fuses together.

However, because these processes generally involve relatively high temperatures, occur over a short period of time and involve very small displacements, the development of process monitoring and control systems and methods in such applications has thus been hindered. It has therefore been difficult to adequately ensure good resultant weld quality in this type of application, especially in high speed automated resistance welding processes. Although there have been numerous attempts at performing this function, none have in practice adequately ensured the consistent production of high quality welds.

SUMMARY OF THE INVENTION

The present invention addresses this problem by providing an electrode displacement monitoring and control system. The changing relative distance between the movable electrode and a point substantially fixed in position, such as a workpiece surface, is monitored during the course of a resistance welding process. This displacement information is processed and applied as a control signal for anticipating weld quality as well as adaptively and dynamically varying the applied weld current and/or other weld parameters in order to obtain a good quality weld.

More specifically, the relative displacement of the movable electrode, as well as the rate of change of this displacement, is monitored and controlled by varying the applied weld current. In addition, reversal in the direction of electrode displacement is identified. The time into the weld cycle at which this reversal occurs is used to predict resultant weld quality and to adaptively control the weld process in order to ensure quality by providing reversal at the desired point in the weld cycle. This, in turn, provides an optimum amount of indentation of the electrodes into the workpiece which thereby leads to the production of a strong weld. It also enables the dynamic variation of applied weld current in order to predict and prevent expulsion as well as to produce quality edge welds.

These and other advantages and features of the present invention will become apparent from the following description taken in conjunction with the accompanying drawings.

DETAILED DESCRIPTION OF THE PREFERRED EMBODIMENT

Figure 1:
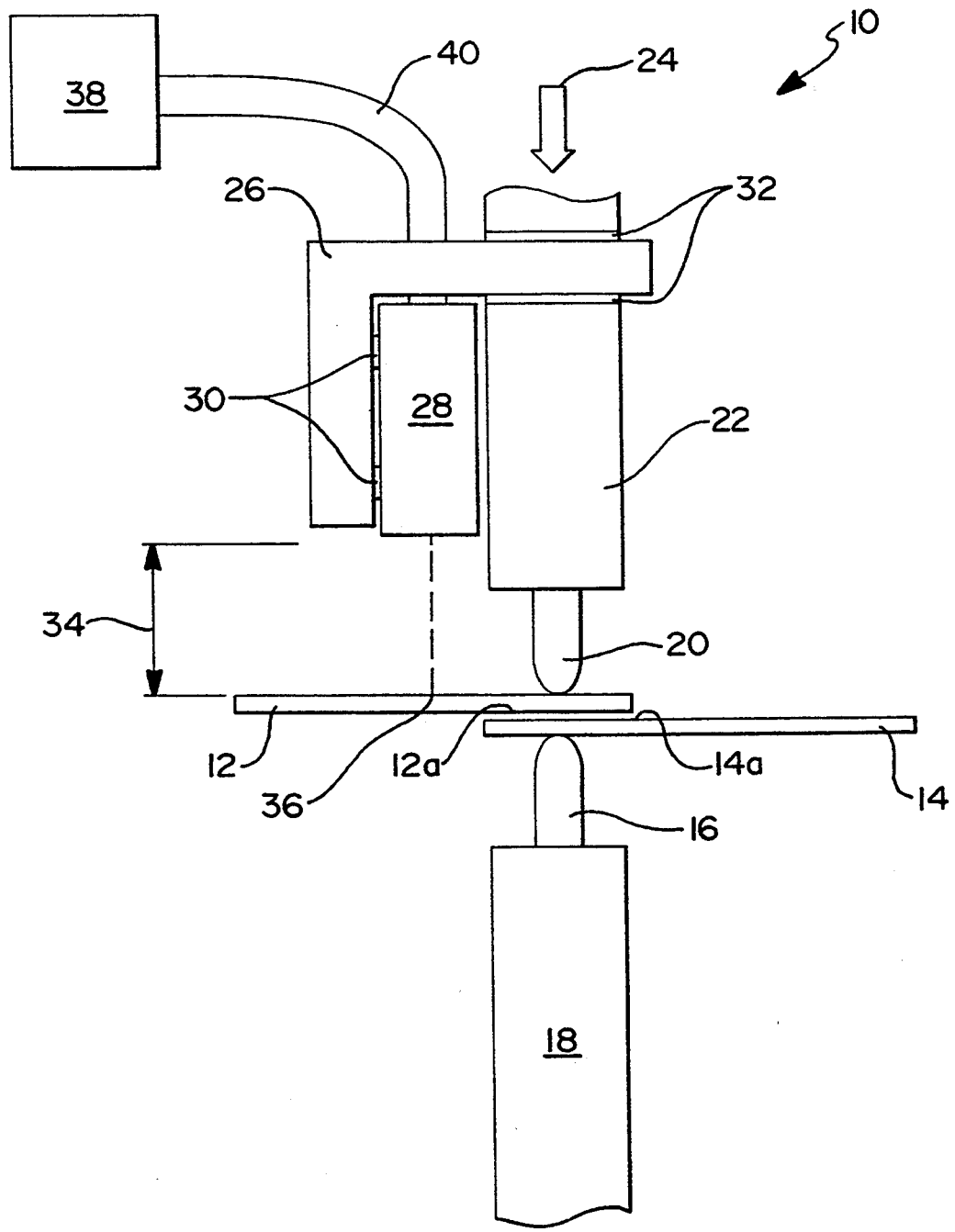
FIG. 1 is a schematic diagram of the monitoring and control system of the present invention, as implemented in a typical resistance spot welding application.

Turning now to the drawings, and in particular to FIG. 1, a resistance welding system equipped with the displacement monitoring and control system of the present invention is indicated generally at 10. As shown therein, a pair of workpieces 12 and 14 are fixtured in an overlapping relationship above a rigid or fixed position electrode 16 which is held in a fixed electrode holder 18. A movable electrode 20 is positioned axially opposite fixed electrode 16 in an electrode holder 22, the electrode 20 and holder 22 being movable toward fixed electrode 16 via a force such as that provided by an air cylinder 24.

Using an appropriately fashioned mounting device such as a bracket 26, a sensor 28 is rigidly affixed to movable electrode holder 22, such as by fasteners 30. In order to electrically insulate the sensor 28 from the intense electricity utilized in the welding operation, a suitably fashioned nonconductive insulator 32 may also be positioned between holder 22 and bracket 26. In the presently preferred embodiment, sensor 28 is a laser-based sensor which operates on a time-of-flight or triangulation principle, but sensor 28 may alternately be any other appropriate optical or other type of sensor adapted to measure the instantaneous relative distance 34 from itself to the upper surface of the workpiece ultimately contacted by movable electrode 20.

Sensor 28 is preferably positioned with respect to electrode holder 22 so as to obtain an electrode-to-workpiece displacement at a point on workpiece 12 which remains substantially fixed in position during the weld process and which is not effected significantly by resistance heating. In the presently preferred embodiment, the beam generated by laser sensor 28 is focused onto a spot 36 on the upper surface of workpiece 12, with spot 36 lying approximately 0.1 to 1.75 inches from the nearest outside surface of electrode 20. Since workpiece 12 remains substantially fixed in position throughout the weld process, the distance 34 represents the relative displacement of movable electrode holder 22, and therefore movable electrode 20.

Figure 2:
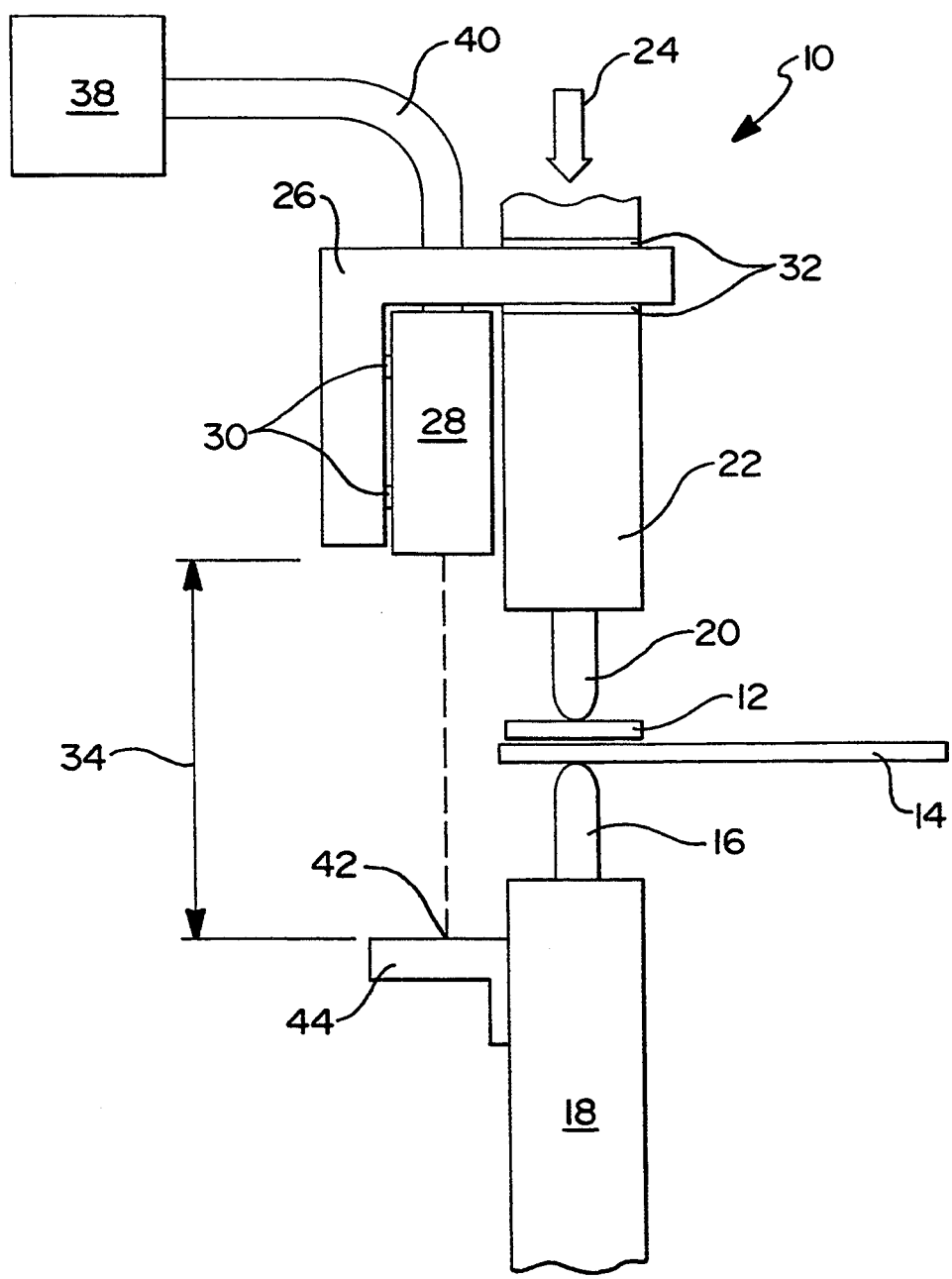
FIG. 2 is a schematic diagram similar to that of FIG. 1 illustrating an alternate embodiment of the present monitoring and control system.

Alternately, however, the distance between sensor 28 and some other fixed point, such as on a fixture attached to fixed electrode holder 18 or another stationary point on the welder, may also be obtained with substantially the same result, differing primarily in terms of magnitude. Such an alternate embodiment is illustrated in FIG. 2. As shown therein, an optical sensor 28, preferably a fiberoptic sensor, is mounted to the movable electrode holder 22 so as to measure the relative distance from itself to a specified target point, such as point 42 on an appropriately fashioned fixture 44 which has been secured to fixed electrode holder 18. Like the previous embodiment, this second sensor configuration is adapted to track the relative displacement of the movable electrode holder 22, and therefore movable electrode 20, with respect to some other point in the welding system. Thus, any of a wide variety of sensors and sensor configurations, as known by those having skill in the art, could be used to track the relative displacement of the movable electrode as required for the control strategies discussed hereinbelow. The same applies to projection welding applications.

Sensor 28 is preferably adapted to produce a continuing series of discrete output signals, in the embodiment shown in FIG. 1 each being indicative of the instantaneous relative displacement 34 between sensor 28 and workpiece 12. These signals are preferably output to a signal processor 38 via an output line 40. Processor 38 is preferably a microprocessor-based system which can also display these values or is otherwise connected to a suitable display device. Processor 38 is also preferably electrically connected to, or resident in, the controller utilized to control the movement of electrode 20 as well as the application of weld current.

A resistance spot weld made on this type of system generally begins with the application of a "pre-squeeze" or "squeeze" force. Air pressure from cylinder 24 acts upon a piston rod attached to the electrode holder 22 and drives movable electrode 20 against the upper workpiece 12. Electrode 16, being rigidly mounted, serves as a backstop for workpiece 14. With the pre-squeeze or squeeze force applied, the initial electrode displacement 34 is indicative of the electrode wear and/or workpiece thickness.

Upon completion of the squeeze cycle, welding current impulses are applied while the force from air cylinder 24 is maintained. Typically, weld current is applied for two to fifty cycles of sixty cycle alternating current, each half-cycle generally being individually controllable. As the welding current is applied, the interfaces between electrodes 16 and 20 and workpieces 12 and 14, are resistance heated. Heating at these interfaces generally results in thermal expansion of workpieces 12 and 14, as well as of electrodes 16 and 20 and electrode holders 18 and 22. The electrodes and holders, however, are typically water cooled and therefore may not contribute much to the total amount of expansion in comparison to the expansion of the workpieces. During this early part of the welding cycle, the initial hardness of the workpiece material generally prevents any indentation by the electrodes 16 and 20 into the workpiece material.

From the application of the initial weld current half-cycles, expansion occurs, moving electrode 20 against and in a direction opposite to the weld force applied by cylinder 24. This therefore results in an increasing relative distance or displacement 34 between electrode 20 and workpiece 12. Generally, this expansion phase of the electrode to workpiece movement lasts from the first current half-cycle to about one-third or two-thirds of the total number of current half-cycles and is generally more pronounced in resistance welding bare or uncoated materials.

At some point in this process, the material at workpiece overlapping or faying surfaces 12a and 14a begins to melt. Melting progresses as additional material in the surrounding general vicinity of the newly forming nugget continues to rise in temperature. On a microscopic scale, there is both expansion and contraction due to changes of state and phase in the workpiece material. Also, as temperature continues to increase, the hardness and strength of the workpiece material diminishes and indentation of electrodes 16 and 20 into the outer surfaces of workpieces 12 and 14 is made easier.

A significant net effect which occurs at some point while applying weld current is a reversal in the movement of electrode 20 away from workpiece 12 and therefore a subsequent decrease in the amount of relative displacement 34. At this time the expansion phase halts and electrode 20 ceases to move in a direction opposite to the force applied by air cylinder 24. Expansion forces from the workpieces, weld zone, electrodes and holders seem balanced against air cylinder weld force. Generally, however, this period of electrode reversal is short-lived, typically lasting only about one to four half-cycles.

Following electrode movement reversal, with current still being applied, movable electrode 20 moves toward fixed electrode 16, thereby resulting in a progressively decreasing workpiece-to-electrode distance 34. This electrode movement in the direction of the applied cylinder force is primarily due to the electrodes indenting the workpiece surfaces. As this indentation continues, there is a progressively smaller distance 34 between the electrode and workpiece surface at spot 36. For most welds, the electrode displacement distance continues to decrease until the weld current is interrupted. During a subsequent "hold" period prior to release of the workpiece by the movable electrode, the weldment cools and the electrode displacement continues to decrease as the weldment contracts. During this time, there is both electrode indentation and workpiece contraction.

Figure 3:
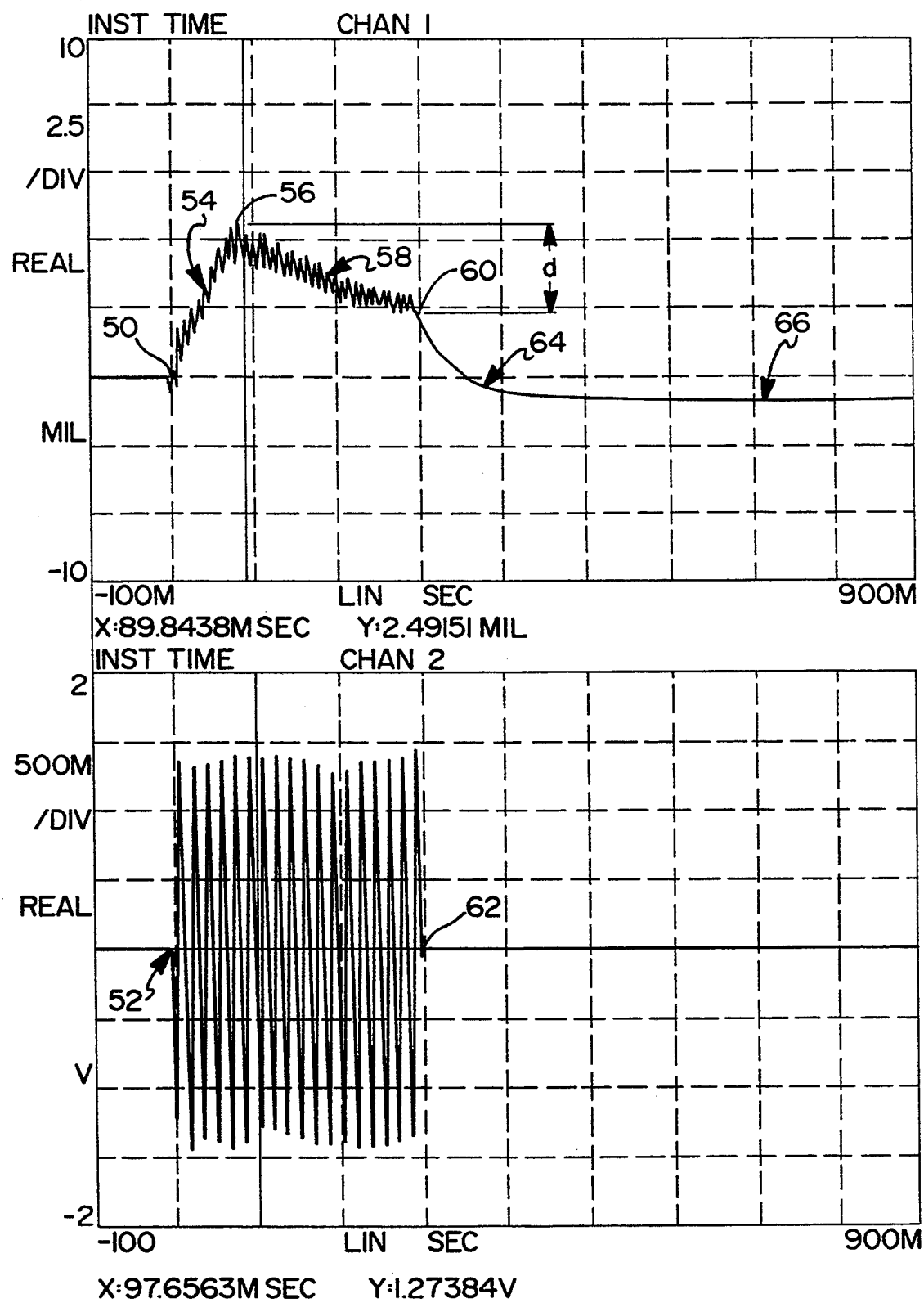
FIG. 3 is a graphical representation illustrating the monitored electrode displacement and applied current during a successful welding cycle.

This changing displacement 34 is best illustrated with reference to the graph shown in FIG. 3, the data plotted in FIG. 3 being obtained with the weld system illustrated in FIG. 1 on bare uncoated steel. In this figure, displacement 34 is plotted with respect to time on the upper plot and the applied current is shown below. The weld cycle begins at point 50 with the application of the first current half cycle at 52. As current is applied, the expansion phase begins, as shown along curve portion 54. Although the displacement illustrated in the figures has not been filtered for noise, appropriate filtering of the raw displacement signals obtained by sensor 28 would result in a smoother curve.

The expansion phase continues until point 56, at which time reversal in the direction of movement of electrode 20 occurs, approximately twelve half-cycles or six full cycles into current application. The point at which this reversal occurs can be determined mathematically as the point at which the slope of an imaginary line connecting contiguous instantaneous measured displacement values equals zero, or that point at which the slope changes in sign from positive to negative.

After reversal, a downward slope in curve 58 continues until point 60, at which time weld current is interrupted at 62. During this phase the electrode 20 moves toward the workpiece, thus resulting in a decreasing electrode displacement d, which can be referred to as the "dynamic indentation". After weld current ceases, the displacement decrease continues along curve 64, as indentation of the electrodes into the workpieces and concurrent metal contraction usually continues for some time after the current is removed. The displacement eventually reaches a near constant level 66 as the workpiece material hardens. As shown in the figure, the amount of dynamic indentation generally constitutes a relatively small portion of the total amount of indentation.

Figure 4:
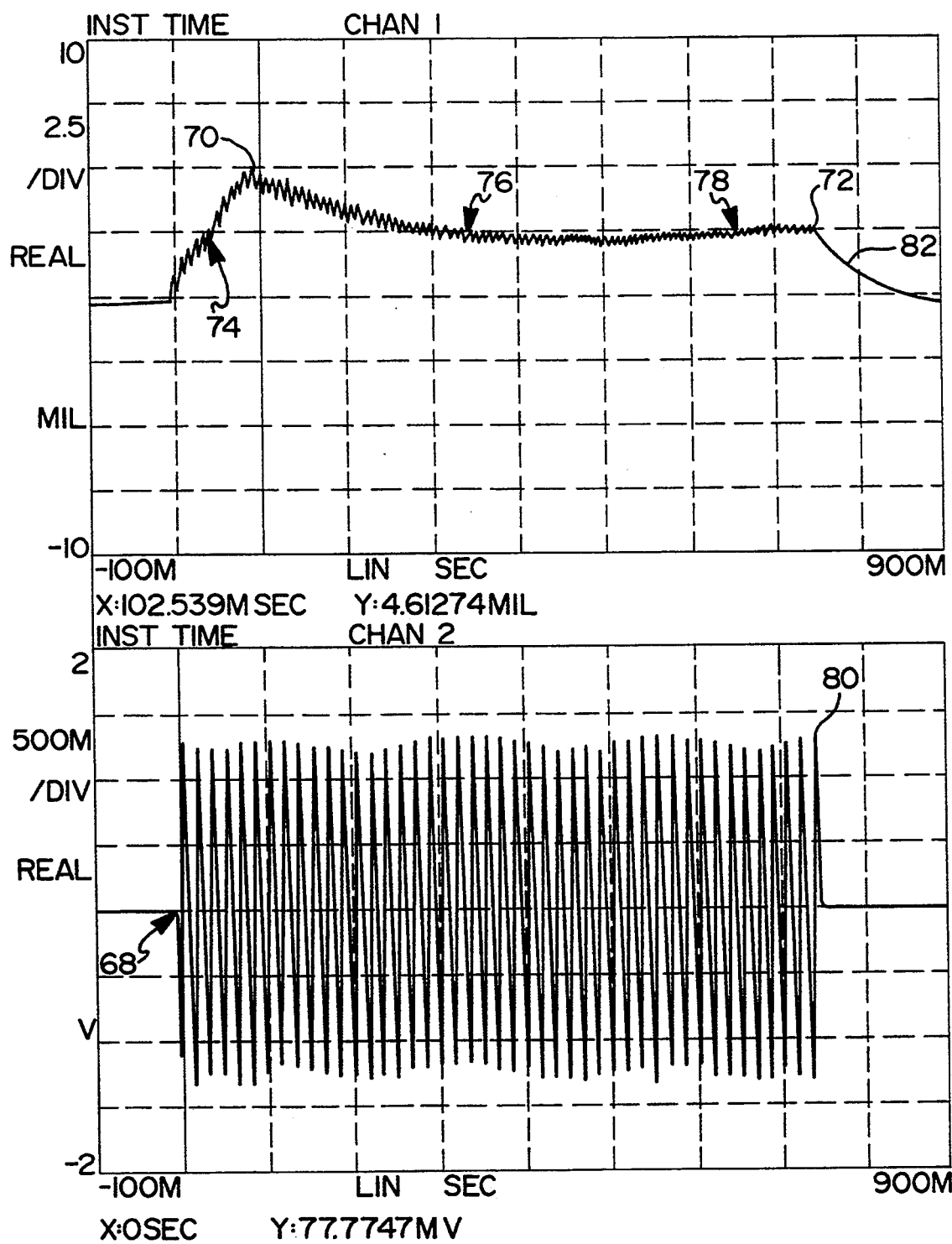
FIG. 4 is a graphical representation similar to FIG. 3 illustrating the electrode displacement and current during a longer welding cycle.

FIG. 4 illustrates a similar signature obtained from a known good quality weld having a longer period of current application. Note, however, the appearance of two points of reversal, 70 and 72. When current is applied at 68, a normal period of expansion occurs at 74 until the first reversal point 70. Thereafter, a phase of dynamic indentation occurs at 76, and then a small second expansion at 78. After a second reversal, occurring substantially simultaneously with the last half-cycle of current at point 80, further contraction and indentation occurs along curve segment 82.

The signal output by sensor 28 displayed in this fashion thus provides a weld displacement profile or "signature". Analysis of this signature, and of the relative electrode displacement at certain key points, as well as the rate of change of the measured displacement values, can then be used to analyze the weld process and to predict and control resultant weld quality. The sensed "reversal" in electrode movement is found to be a key feature in assessing spot weld quality, particularly on bare or uncoated steel. While some measure of electrode indentation will be masked by material expansion, the primary factor causing the electrode to move closer to the workpiece after the electrode movement reversal is the dynamic indentation. It is generally known by those having skill in the art that a certain amount of post weld indentation correlates to high weld strength.

The output signal values from sensor 28 clearly shows the reversal of the electrode movement from expansion against the weld force from the cylinder, to dynamic indentation, which occurs in the direction of the weld force from the cylinder. Electrode movement reversal, in addition to the continuing movement of the electrode toward the workpiece, typically for one to ten additional half-cycles, generally assures that a good quality weld has been deposited. Sensing of this point, at which the slope of the displacement curve approaches zero, as well as the rate of change of the instantaneous displacement values, allows for a number of monitoring and control strategies in accordance with this invention.

A first monitoring and control strategy of this invention involves selecting a predetermined weld time or number of weld cycles, and then adaptively modulating the weld current to force a specific electrode displacement profile or signature, preferably within certain specified limits. However, the desired profile tends to be very application specific and depends greatly on the materials used, metal thickness and other related parameters. Therefore, the target displacement profile to be achieved for a given application is preferably determined empirically, by gathering and comparing profiles for welds found by physical testing to have both good and poor quality. However, knowledge gained from repeated use Of this method can also be used to define a target displacement signature for a given application.

At the beginning of the weld, a typical weld controller of the type generally described herein generally fires a number of silicon controlled rectifiers (SCRs) at a predetermined controllable firing angle. Under this control strategy, the initial firing angle may be based upon displacement data obtained from the previous weld. If the reversal in electrode movement detected in the previous weld was achieved, for instance two half-cycles sooner than desired, the firing angle in the present weld is retarded slightly to thereafter deliver less current and to thereby slow the onset of electrode movement reversal. If electrode indentation was insufficient in the previous weld, the controller advances the firing angle so that more time for indentation is allowed within the fixed time period allocated for the weld since indentation can generally occur only after reversal of the electrode movement. Alternately, any other suitable method for modulating weld current to control the resultant displacement profile may likewise be used.

In addition to electrode movement reversal and the subsequent electrode indentation, the displacement profile can be subdivided to include expansion and dynamic indentation regulation to further ensure that a good weld is obtained in the fixed weld time period. With this level of control, the desired displacement profile is detailed on a one cycle or half-cycle basis. For example, an operator may select a ten cycle weld having an expansion phase lasting six cycles. One cycle for the electrode movement reversal is then allocated, with the additional three cycles for electrode indentation. Specific quantitative ranges of displacement values may also be determined.

During the weld, sensor 28 continually provides displacement data to the controller. If expansion, as compared to a target expansion, is excessive after two cycles, the controller retards the firing angle to provide less current and reduce heating. If electrode movement reversal is not achieved in seven cycles, fourteen half-cycles, the current is increased on the fifteenth half-cycle to provide a correction. As necessary, the current may be driven even higher to force electrode movement reversal and the subsequent dynamic indentation during successive cycles. If a pre-programmed dynamic indentation is not reached or, in the worse case scenario, if the reversal of the electrode movement is not achieved, the controller may then activate indicator lamps appropriately indicative of the fault.

Figure 5:
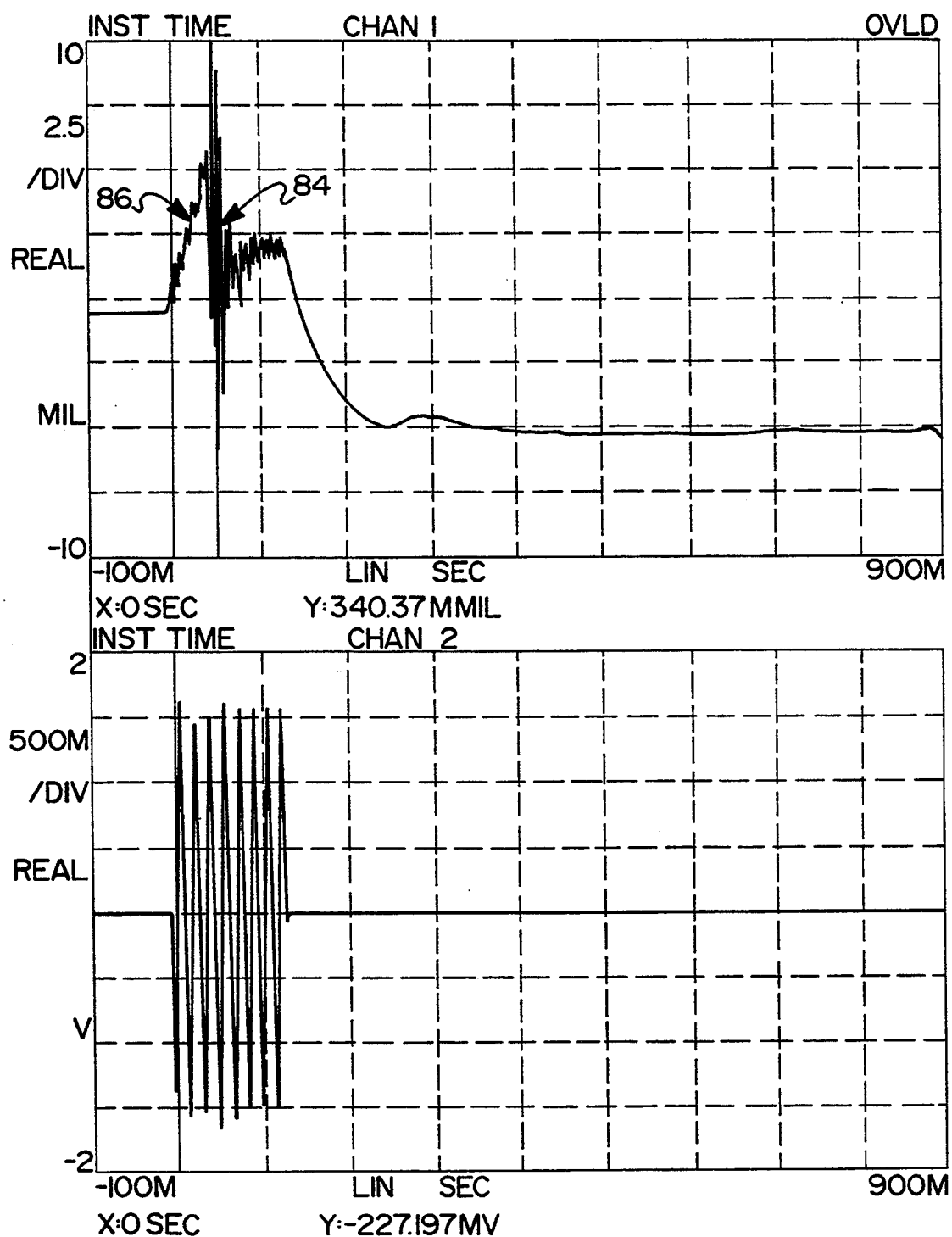
FIG. 5 is a graph similar to FIGS. 3 and 4 which illustrates displacement occurring during an expulsion.

Utilizing sensor 28 for measuring electrode displacement also enables the detection of expulsion and can be used to avoid expulsion, an undesirable spatter of molten metal most often caused by an excessively high current. An example of a displacement signature obtained on a bare steel weld during an expulsion is indicated in FIG. 5. As shown clearly therein, an expulsion can be identified by a sudden, near-vertical plummet 84 in the displacement signature graph, in the direction opposite to that of expansion. However, expulsion is usually preceded by an excessive rate of expansion, shown in the figure as curve segment 86. If the expansion profile is well defined, the controller will be able to interpret an excessive expansion rate as undesirable and adjust the current downward to prevent expulsion. This can be done by defining a desired or target slope for the expansion curve, as well as an amount of allowed deviation therefrom, and comparing the measured displacement slope to the target slope. However, if expulsion occurs unexpectedly or despite adjustments by the controller, the starting current for the next weld can thereafter be decreased until a satisfactory expansion rate is measured.

In this regard, another possible control strategy enabled by the system and method of the present invention is a constant current, variable time weld control method. Using this approach, the weld controller delivers a constant current in the secondary by means of data from a pickup coil such as an air toroid. Displacement sensor 28 monitors the changing electrode displacement. The constant weld current output is maintained until a set period of time after displacement sensor 28 detects the reversal of electrode movement from expansion to indentation. Highest weld strengths are obtained when the current is not terminated immediately upon the reversal of the electrode movement but is maintained for several cycles after reversal. These additional current cycles promote electrode indentation into the workpiece surfaces. For a fifteen to twenty cycle weld schedule, the electrode indentation period, following electrode movement reversal, preferably lasts from six to ten cycles.

Because "mushrooming" of the electrode tips can extend the time to reversal of the electrode movement, it is also necessary to establish "windows" or permissible thresholds in time during which the weld must be accomplished. For example, in a fifteen cycle weld, if the reversal in electrode movement is not reached in ten cycles, then the welding current is terminated and the controller activates an appropriate fault lamp. For the same weld schedule, if electrode movement reversal is detected only after three cycles, the welding current is terminated and a fault lamp is likewise activated. While the best results have been obtained with weld controllers regulating current in the secondary, other controllers with primary current regulation, power factor regulation or automatic voltage compensation can be used successfully with the electrode displacement variable time method.

Alternately, yet another control strategy may be used in conjunction with the displacement monitoring system and method of the present invention. Like the variable time method described above, this dynamic indentation method is based on the detection of the reversal of the electrode movement. Since highest weld strengths are obtained if the current is not terminated immediately upon the electrode movement reversal, this indentation specific method maintains the welding current following electrode movement reversal, until the sensor and controller detect a pre-programmed amount of dynamic indentation during the weld. In this instance, the dynamic indentation is determined as the electrode displacement measured from the point of reversal during the application of the current pulse. However, it should be noted that this relates only to the "dynamic" or directly controllable indentation occurring during the application of weld current and additional indentation and contraction usually occur after the weld current is interrupted. Similar to the variable time method described above, windows or thresholds can be established so that the electrode movement reversal and the specified dynamic indentation are obtained in predefined reasonable times.

A further approach involves maintaining weld current until electrode movement reversal and the subsequent electrode indentation phases have been completed. Welding current is terminated only after a specific number of cycles following a minimum sensed dynamic indentation or after a second electrode movement reversal. Yet another alternative approach involves maintaining a constant weld current until electrode movement reversal and the indentation phases have been completed and until a specific second expansion has been obtained.

In order to deal with more difficult weld conditions under any of the aforementioned control strategies, certain adjustments to the system and processes discussed above are possible. For instance, coated materials such as hot dipped galvanized steel and electro-galvanized steel which have an outermost layer consisting of a low melting temperature material can be resistance spot welded. However, it must be kept in mind that when welding some coated materials the coating may expand, melt or vaporize away early in the welding cycle, typically before the base material completes the initial expansion phase. As the coating material rises in temperature, a small expansion peak can sometimes occur followed by a small reversal in electrode movement. The easiest way to prevent this small signal from triggering an undesirable response from the controller is to ignore the signals early in the weld cycle, for instance the first five cycles in a sixteen cycle weld on a coated material could be ignored.

Similarly, edge welds may also present problems since their proximity to the edge of the workpiece limits the amount of thermal mass or heat sink available and the fitup at the edge is usually poor, thereby providing opportunities for the molten metal to escape from the workpiece interfaces in a manner similar to an expulsion. The corrective action required to prevent expulsion from occurring during an edge weld is to significantly reduce the welding current. In the present control strategy, if the present displacement sensor is used to monitor the expansion rate, an edge weld condition should be detected after a few half-cycles of current. The expansion rate for the edge weld, i.e. the slope of the expansion curve, will be unusually high. With a variable current system, the controller will reduce the weld current substantially as soon as the high expansion rate is detected. This type of action may significantly reduce or prevent expulsion.

The present invention thus enables the prediction and control of resistance spot weld quality in a relatively simple and cost efficient manner not heretofore envisioned. The control strategies detailed herein can be further tailored individually to produce an optimum quality weld in a wide variety of applications. While various displacement measurements have in the past been monitored in an increasing effort to predict and ensure resulting weld quality, none of the traditional methods have involved a system based upon a reversal of electrode displacement to identify and adaptively control weld quality.

The foregoing discussion discloses and describes an exemplary embodiment of the present invention. One skilled in the art will readily recognize from such discussion, and from the accompanying drawings and appended claims, that certain changes, modifications and variations can be made therein without departing from the spirit and scope of the invention as defined in the following claims.

It is claimed:

1. In a resistance welding system wherein a workpiece is positioned with respect to an electrode which is movable axially toward and away from a given point which remains substantially fixed in position during a weld cycle, wherein an electronic weld controller controls the application of electrical current thereto, a method of adaptively controlling the application of electrical current comprising the steps of:

positioning a sensor with respect to said welding system, said sensor being adapted to provide a series of discrete output signals each indicative of the instantaneous displacement of said movable electrode with respect to a point on said workpiece;

electrically connecting a processor means between said sensor and said weld controller, said processor means being adapted to process said output signals from said sensor to produce a control signal to be applied to said weld controller;

allocating a predetermined time for application of weld current by said controller for at least one of an expansion phase, a reversal phase and an indentation phase;

identifying a reversal wherein said displacement signals cease increasing in magnitude and begin to decrease; and controlling the application of weld current in accordance with said control signal such that said displacement is controlled according to said predetermined time allocation.

2. The method of claim 1 wherein said sensor includes a laser and further including the steps of mounting said sensor so as to move with said movable electrode and measuring the instantaneous displacement between said sensor and a point on said workpiece.

3. The method of claim 2 wherein said point on said workpiece is one not likely to substantially be expanded or contracted during the welding process due to heat resulting from the application of weld current.

4. In a resistance welding system wherein a workpiece is positioned with respect to an electrode which is movable axially toward and away from a given point which remains substantially fixed in position, wherein an electronic weld controller controls the application of electrical current to the electrodes, a method of adaptively controlling said weld controller comprising the steps of:

positioning a sensor with respect to said welding system, said sensor being adapted to provide a series of discrete output signals each indicative of the instantaneous displacement of said movable electrode with respect to said workpiece;

identifying a reversal wherein said displacements cease increasing in magnitude and begin to decrease;

allocating a predetermined displacement value to at least one of an expansion prior to said reversal, said reversal or an indentation following said reversal; and modulating the current applied to said electrodes in a manner to achieve said predetermined displacement.

5. The method of claim 4 further comprising the step of electrically connecting a processor means between said sensor and said weld controller, said processor means being adapted to process said output signals from said sensor to produce said control signal.

6. The method of claim 5 wherein said processor identifies said reversal by monitoring the slope of an imaginary line between successive output displacement signal values and determining the point at which the slope is substantially equal to zero or changes in sign.

7. The method of claim 5 wherein said processor includes a display device and further including the step of displaying said instantaneous displacements with respect to time.

8. The method of claim 5 further comprising the steps of preselecting a number of weld cycles and modulating said current applied to said controller to obtain a predetermined displacement profile.

9. The method of claim 5 further comprising the step of detecting an expulsion by identifying a sudden sharp increase in the instantaneous displacement.

10. The method of claim 9 further comprising the step of anticipating an expulsion by detecting an excessive rate of decrease in instantaneous displacement.

11. The method of claim 10 wherein said controller decreases the starting current for a next weld if an expulsion is identified in a previous weld.

12. The method of claim 10 further including the step of decreasing applied current in response to said excessive expansion rate.

13. The method of claim 5 further comprising the step of maintaining weld current after identification of a reversal only until a predetermined amount of displacement indicative of indentation is identified.

14. The method of claim 5 further comprising the step of setting certain predefined ranges for said instantaneous displacements and providing a fault indication if a measured displacement falls outside of said predetermined range.

15. The method of claim 14 wherein said predetermined range is defined both in terms of magnitude and time.

16. The method of claim 4 further comprising the step of maintaining the application of weld current for a predefined number of cycles after a reversal is identified.

* * * * *